United States Patent
Takayama

(10) Patent No.: US 8,422,107 B2
(45) Date of Patent: Apr. 16, 2013

(54) OPTICAL SCANNING DEVICE, IMAGE DISPLAY DEVICE AND RETINAL SCANNING DISPLAY

(75) Inventor: Haruhisa Takayama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 687 days.

(21) Appl. No.: 12/654,603

(22) Filed: Dec. 24, 2009

(65) Prior Publication Data

US 2010/0118369 A1 May 13, 2010

Related U.S. Application Data

(63) Continuation-in-part of application No. PCT/JP2008/061700, filed on Jun. 27, 2008.

(30) Foreign Application Priority Data

Jun. 29, 2007 (JP) ................................ 2007-173465

(51) Int. Cl.
G02B 26/08 (2006.01)
(52) U.S. Cl.
USPC .................................... 359/199.1; 359/213.1
(58) Field of Classification Search .............. 359/198.1, 359/199.1, 201.1, 201.2, 202.1
See application file for complete search history.

(56) References Cited

U.S. PATENT DOCUMENTS

| | | | |
|---|---|---|---|
| 5,671,076 A | 9/1997 | Matsubara et al. | |
| 5,982,525 A | 11/1999 | Matsubara et al. | |
| 6,937,372 B2 * | 8/2005 | Kandori et al. | ............ 359/198.1 |
| 2003/0021497 A1 | 1/2003 | Kandori et al. | |
| 2005/0024701 A1 | 2/2005 | Cannon et al. | |

FOREIGN PATENT DOCUMENTS

| | | |
|---|---|---|
| EP | 1 275 998 B1 | 3/2005 |
| JP | A 5-23220 | 12/1993 |
| JP | A-05-323220 | 12/1993 |
| JP | A 8-94959 | 4/1996 |
| JP | A 2003-131151 | 5/2003 |
| JP | A 2004-301973 | 10/2004 |
| JP | A 2005-181477 | 7/2005 |
| JP | A 2005-242037 | 9/2005 |
| JP | A 2007-94279 | 4/2007 |

OTHER PUBLICATIONS

Written Opinion (with Translation) issued in corresponding International Application No. PCT/JP2008/061700, issued Aug. 5, 2008.
Translation and International Search Report issued in corresponding International Application No. PCT/JP2008/061700, mailed Aug. 5, 2008.

(Continued)

Primary Examiner — Euncha Cherry
(74) Attorney, Agent, or Firm — Oliff & Berridge, PLC

(57) ABSTRACT

An optical scanning device includes an optical scanning element which has a reflection mirror and is configured to perform reciprocating scanning of an optical flux radiated from a light source by resonance oscillations of the reflection mirror; a photo detector which is arranged at a position which a portion of the optical flux scanned by the optical scanning element in a reciprocating manner passes in both outgoing-path scanning and incoming-path scanning, and is configured to output a pulse signal having a predetermined width at a point of time that the scanned optical flux is detected; and the reference signal generator which is configured to detect timing between rising edge timing of one pulse signal and falling edge timing of the other pulse signal out of two pulse signals continuously outputted from the photo detector, and to generate the reference signal based on intermediate timing between the edge timings.

5 Claims, 11 Drawing Sheets

OTHER PUBLICATIONS

Sep. 17, 2012 Search Report issued in European Patent Application No. 08790665.7.

Aug. 21, 2012 Office Action issued in Japanese Patent Application No. 2007-173465 (with translation).

\* cited by examiner

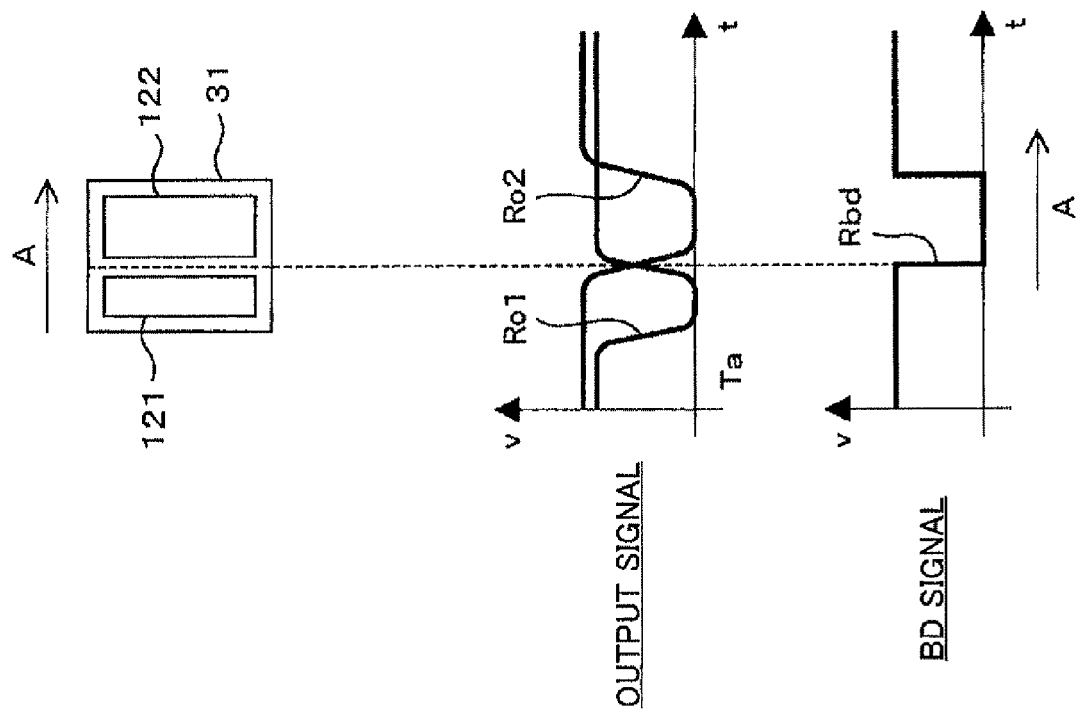

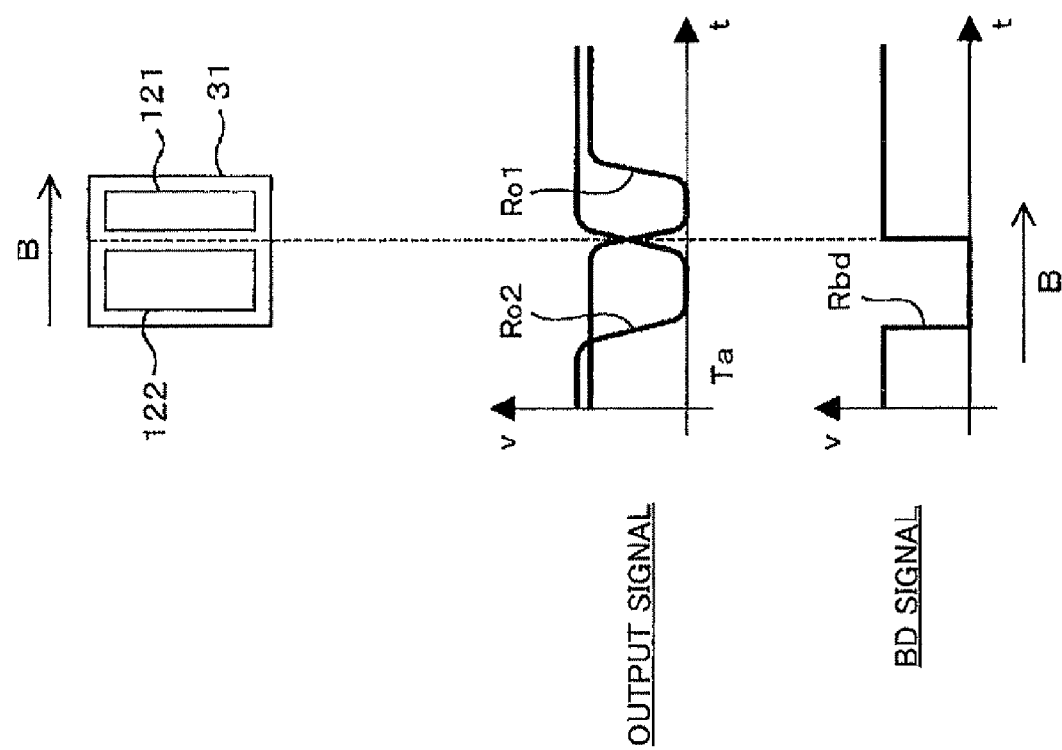

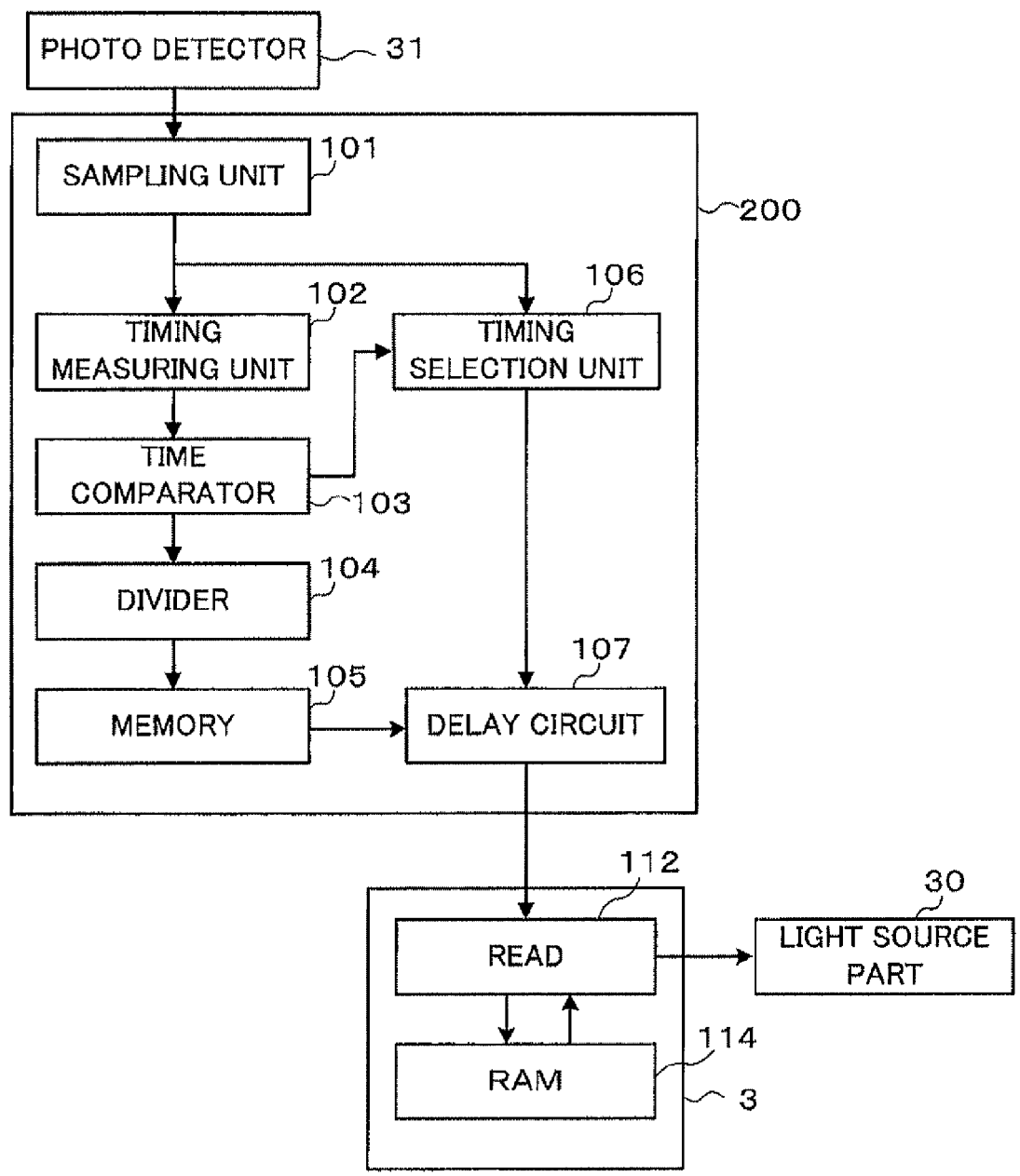

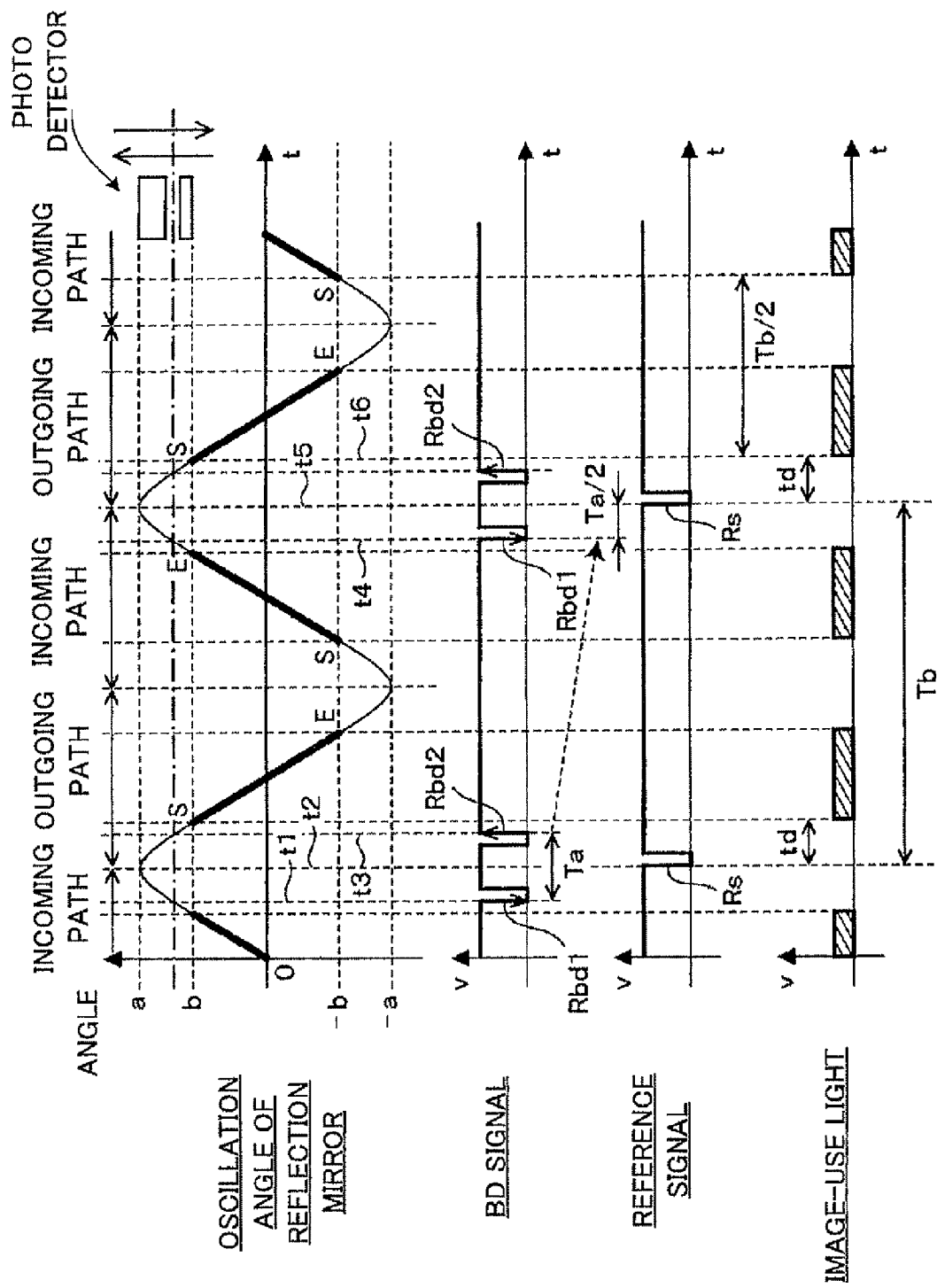

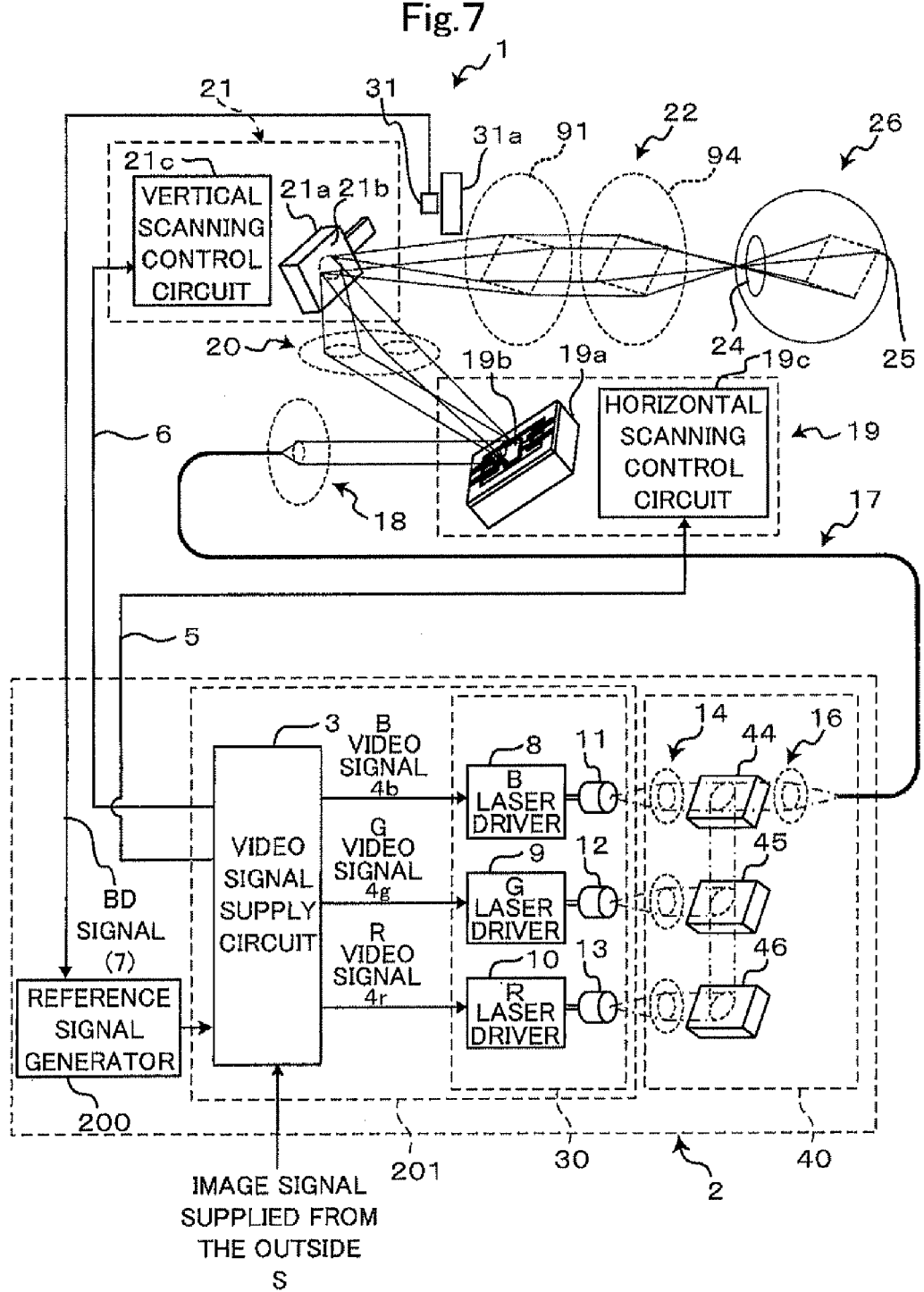

OPTICAL SCANNING DEVICE, IMAGE DISPLAY DEVICE AND RETINAL SCANNING DISPLAY

CROSS-REFERENCE TO RELATED APPLICATIONS

The present application is a Continuation-in-Part of International Application PCT/JP2008/061700 filed on Jun. 27, 2008, which claims the benefits of Japanese Patent Application No. 2007-173465 filed on Jun. 29, 2007.

BACKGROUND

1. Field

The present invention relates to an optical scanning device, an image display device provided with the optical scanning device, and a retinal scanning display provided with the optical scanning device.

2. Description of the Related Art

Conventionally, an optical scanning device has been used in a laser printer device, a projection device or the like. This optical scanning device uses an optical scanning element having a reflection mirror which scans an optical flux by oscillations. The optical flux scanned by the optical scanning element is projected on a projection surface such as a screen so that an image is formed on the projection surface, or the scanned optical flux is projected on a retina of an eye so that an image is formed on the retina.

In the optical scanning device, a scanning position of an optical scanning element is detected by a photo detector, and an optical flux is outputted to the optical scanning element based on a result of the detection. Due to such processing, an image is displayed at a proper position.

To be more specific, the optical scanning device includes a reference signal generator which generates a reference signal which becomes the reference with respect to timing at which the optical flux is radiated from a light source. When the optical flux which is scanned by the optical scanning element is detected by the photo detector, based on detection timing at which the optical flux is detected by the photo detector, the reference signal generator generates the reference signal which becomes the reference with respect to timing at which the optical flux is radiated from the light source. The optical flux from the light source is radiated at timing based on the reference signal.

SUMMARY

However, as described above, the reference signal is generated based on timing at which the optical flux scanned by the optical scanning element is detected by the photo detector and hence, when a position of the photo detector is displaced or the detection timing at which the optical flux is detected by the photo detector is staggered, the timing at which the reference signal is generated is also staggered. That is, when the positional accuracy of the photo detector cannot be ensured, the timing at which the reference signal is generated based on the detection timing of the photo detector is staggered thus giving rise to a drawback that the timing at which the optical flux is radiated from the light source is delayed or comes too early. As a result, there arises a drawback that a displayed image is deteriorated.

Particularly, in a reciprocating-scanning-type optical scanning device which scans an optical flux in a laterally reciprocating manner with a predetermined cycle using an optical scanning element, when a reference signal which becomes the reference for timing at which the optical flux is radiated is staggered, a start position of a horizontal line scanned in the right direction and a finish position of a horizontal line scanned in the left direction are displaced from each other, and this displacement brings an edge portion of a screen into a zigzag state and, at the same time, brings a straight line drawn orthogonal to the scanning line into a zigzag line. That is, the staggering of the reference signal gives rise to a drawback that an image is largely deteriorated.

The present invention has been made in view of the above-mentioned drawbacks, and it is an object of the present invention to provide an optical scanning device which can prevent the deterioration of an image by fixing radiation timing of an optical flux from a light source irrelevant to positional accuracy of a photo detector which detects an optical flux.

According to one aspect of the present invention, there is provided an optical scanning device which includes: an optical scanning element which has a reflection mirror and is configured to perform reciprocating scanning of an optical flux radiated from a light source by resonance oscillations of the reflection mirror; a photo detector which is arranged at a position which a portion of the optical flux scanned by the optical scanning element in a reciprocating manner passes in outgoing-path scanning as well as incoming-path scanning, and is configured to output a pulse signal having a predetermined width at a point of time that the scanned optical flux is detected; and a reference signal generator which generates a reference signal which becomes the reference for radiation timing of the optical flux from the light source corresponding to a detection result of the optical flux by the photo detector, wherein the reference signal generator generates the reference signal based on intermediate timing between rising edge timing of one pulse signal and falling edge timing of next pulse signal among pulse signals continuously outputted from the photo detector or intermediate timing between falling edge timing of said one pulse signal and rising edge timing of said next pulse signal.

BRIEF DESCRIPTION OF THE DRAWINGS

FIG. 3A is an explanatory view showing a light receiving surface of a photo IC used as a photo detector and waveforms of signals generated by the photo detector in the embodiment 1;

FIG. 3B is an explanatory view showing a light receiving surface of a photo IC used as a photo detector and waveforms of signals generated by the photo detector in the embodiment 1;

FIG. 5 is a block diagram showing a reference signal generator and parts around the reference signal generator in the embodiment 1;

FIG. 6 is a timing chart for explaining the generation of reference signals different from the reference signals shown in FIG. 4;

FIG. 7 is a block diagram showing a retinal scanning display according to an embodiment 2;

DESCRIPTION OF THE PREFERRED EMBODIMENTS (Embodiment 1)
[Constitution of Image Display Device]

First of all, the constitution of an image display device provided with an optical scanning device is explained.

The image display device 1 is a device in which an optical flux is made incident on a pupil 24 of a viewer who is a user of the image display device 1 so as to project an image on his/her retina 25 thus allowing the viewer to view a virtual image in front of the pupil 24 of a viewer's eye 26. The image display device 1 is also referred to as a retinal scanning display.

Figure 1:
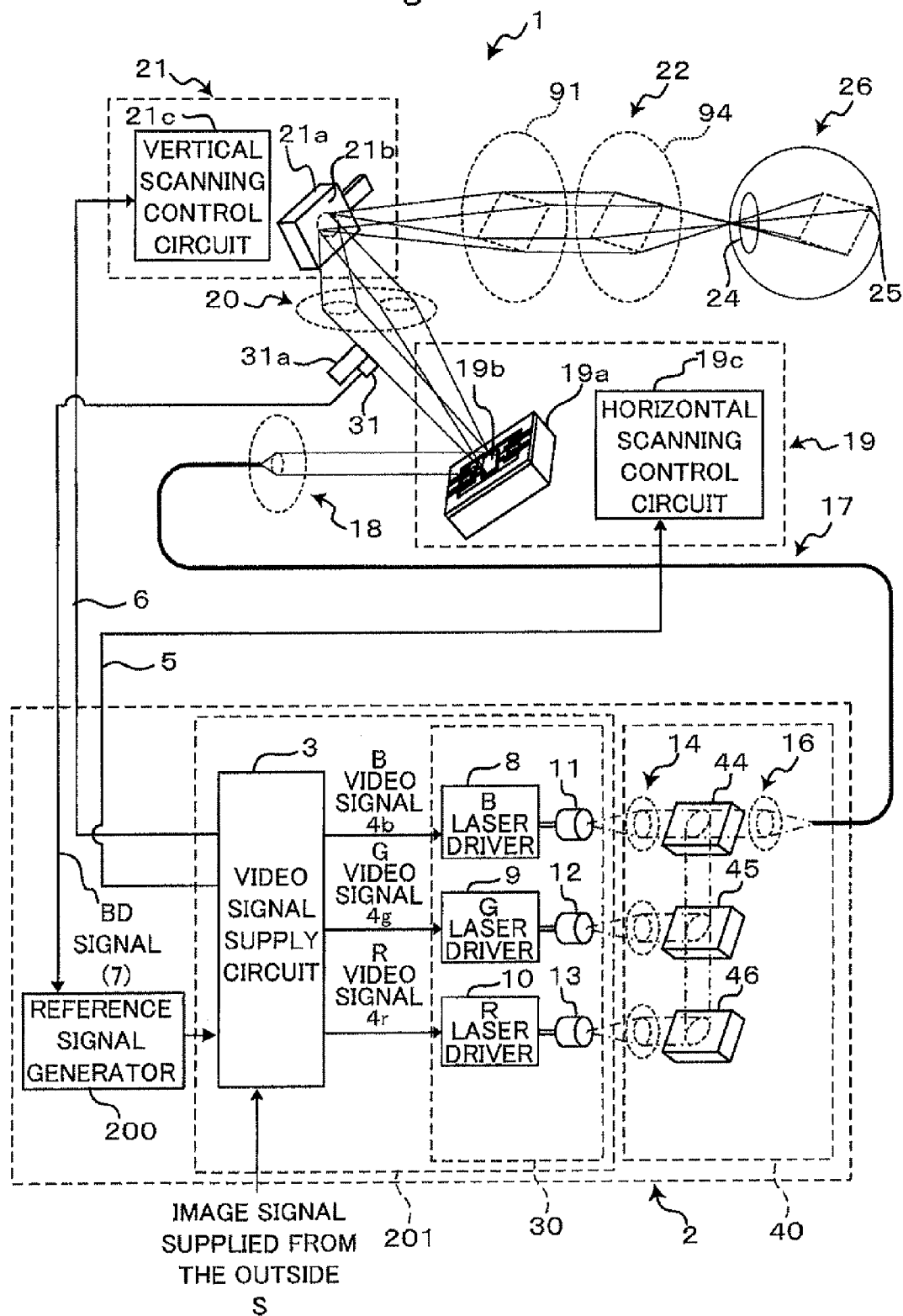
FIG. 1 is a block diagram showing a retinal scanning display according to an embodiment 1.

The image display device 1 includes a light source unit 2 which generates an optical flux whose intensity is modulated in response to an image signal S inputted from the outside and radiates the optical flux. As shown in FIG. 1, the light source unit 2 includes a video signal supply circuit 3 to which an image signal S supplied from the outside is inputted and which generates respective signals or the like constituting components for synthesizing an image in response to the image signal S. In the video signal supply circuit 3, respective video signals 4*b*, 4*g*, 4*r* of blue (B), green (G) and red (R) are generated and are outputted. Further, the video signal supply circuit 3 outputs a horizontal synchronizing signal 5 used in the horizontal scanning part 19 and a vertical synchronizing signal 6 used in the vertical scanning part 21 respectively.

Further, the light source unit 2 includes a light source part 30 for forming three video signals 4*b*, 4*g*, 4*r* outputted from the video signal supply circuit 3 into optical fluxes respectively, and an optical synthesizing part 40 for generating an arbitrary optical flux by combining these three optical fluxes into one optical flux.

The light source part 30 includes lasers which output respective optical fluxes of three primary colors (blue, red, green) based on three video signals 4*b*, 4*g*, 4*r* outputted from the video signal supply circuit 3, and laser drivers which drive these lasers respectively.

That is, the light source part 30 includes a B laser 11 for generating a blue optical flux and a B laser driver 8 for driving the B laser 11, a G laser 12 for generating a green optical flux and a G laser driver 9 for driving the G laser 12, and an R laser 13 for generating a red optical flux and an R laser driver 10 for driving the R laser 13. Here, the respective lasers 11, 12, 13 may be constituted of a semiconductor laser or a solid laser with a higher harmonics generating mechanism, for example.

Here, the video signal supply circuit 3 which generates the video signals 4*b*, 4*g*, 4*r* based on an image signal S, the B laser 11, the G laser 12 and the R laser 13 which output optical fluxes based on the video signals 4*b*, 4*g*, 4*r* and the B laser driver 8, the G laser driver 9 and the R laser driver 10 which drive these lasers are collectively referred to as an image modulator 201 (corresponding to one example of a light source). That is, the image modulator 201 generates optical fluxes modulated in response to the image signal S.

The optical synthesizing part 40 includes a collimation optical system 14 provided for collimating the optical fluxes incident from the light source part 30, dichroic mirrors 44, 45, 46 provided for synthesizing the collimated optical fluxes, and a coupling optical system 16 for guiding a synthesized optical flux into an optical fiber 17.

The optical fluxes of three primary colors which are respectively incident on these three dichroic mirrors 44, 45, 46 are reflected on the dichroic mirrors 44, 45, 46 or are allowed to pass through the dichroic mirrors 44, 45, 46 selectively corresponding to wavelengths thereof, arrive at the coupling optical system 16, and are converged. Then, the converged optical fluxes are outputted to the optical fiber 17.

The optical fluxes radiated via the optical fiber 17 are collimated by a collimation optical system 18. Then, the horizontal scanning part 19 and the vertical scanning part 21, to bring the optical fluxes incident from the collimation optical system 18 into a state which allows the optical fluxes to be projected as an image, scan the optical fluxes in the horizontal direction as well as in the vertical direction. The horizontal scanning part 19 includes an optical scanning element 19*a* having a reflection mirror 19*b* for scanning the optical fluxes in the horizontal direction, and a horizontal scanning control circuit 19*c* which generates a drive signal for oscillating the reflection mirror 19*b* (scanning surface) of the optical scanning element 19*a* by resonance oscillations. The optical scanning element 19*a* is a resonance-type optical scanner and, for example, a Galvano mirror is used as the optical scanning element 19*a* as described in JP-A-2005-181477. The vertical scanning part 21 includes a optical scanning element 21*a* having a reflection mirror 21*b* for scanning the optical fluxes in the vertical direction, and a vertical scanning control circuit 21*c* which drives the optical scanning element 21*a*. Here, the horizontal scanning control circuit 19*c* and the vertical scanning control circuit 21*c* respectively drive the optical scanning element 19*a* and the optical scanning element 21*a* in response to the horizontal synchronizing signal 5 and the vertical synchronizing signal 6 which are outputted from the video signal supply circuit 3.

Further, the image display device 1 includes a relay optical system 20 which relays the optical fluxes between the horizontal scanning part 19 and the vertical scanning part 21. The optical flux which is scanned in the horizontal direction using the optical scanning element 19*a* passes through the relay optical system 20, is scanned by the optical scanning element 21*a* in the vertical direction, and is incident on the relay optical system 22.

The relay optical system 22 includes lens systems 91, 94 having a positive refracting power. The optical fluxes radiated from the vertical scanning part 21, using the lens system 91, have center lines thereof respectively arranged parallel to each other and are respectively converted into converged optical fluxes. Then, using the lens system 94, the converged optical fluxes are arranged substantially parallel to each other and, at the same time, are converted such that the center lines of these optical fluxes are converged on the pupil 24 of the viewer.

Here, the optical scanning device is constituted of the light source unit 2, the optical fiber 17, the collimation optical system 18, the horizontal scanning part 19, the vertical scanning part 21 and the relay optical systems 20, 22 in the above-mentioned constitution.

[Arrangement or Positions of Photo Detector and Light Blocking Mask]

The image display device 1 according to this embodiment includes a photo detector 31 which detects an optical flux scanned by the optical scanning element 19*a* in a reciprocating manner and generates a pulse signal (hereinafter also referred to as "BD signal") having a predetermined width within a detection time. The photo detector 31 is arranged at a position between the optical scanning element 19*a* and the relay optical system 20 as shown in FIG. 1.

Figure 2:
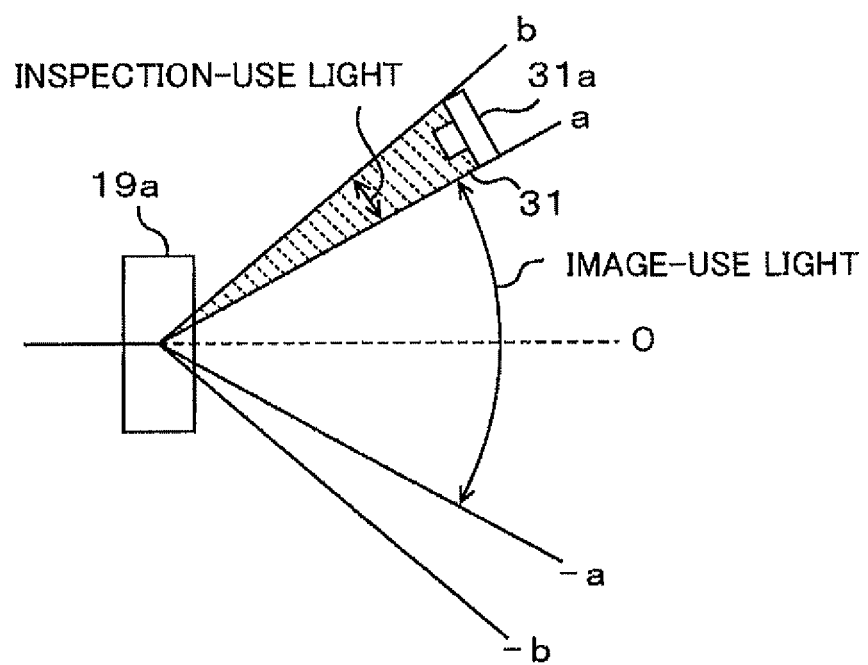
FIG. 2 is an image view showing optical scanning performed in the embodiment 1.

As shown in FIG. 2, the reflection mirror 19b of the optical scanning element 19a performs resonance oscillations (swinging) within an angle range of +b to −b by setting a predetermined position as the reference (0 degree) in response to a drive signal from the horizontal scanning control circuit 19c. The optical scanning element 19a scans light corresponding to an image signal (also referred to as "image-use light") out of the optical flux radiated from the light source unit 2 within an effective scanning range. That is, as shown in FIG. 2, the image-use light is formed such that the optical flux from the light source part 30 is radiated within a range from +a to −a. Then, the optical scanning element 19a scans the image-use light when the reflection mirror 19b is swung from +a to −a (hereinafter referred to as "outgoing-path scanning"), and also scans the image-use light when the reflection mirror 19b is swung from −a to +a (hereinafter referred to as "incoming-path scanning").

Further, the optical scanning element 19a scans the optical flux to be detected by the photo detector 31 (hereinafter referred to as "inspection-use light") outside the effective scanning range. Here, the photo detector 31 is arranged so as to detect the inspection-use light outside the effective scanning range. That is, the inspection-use light is formed such that the optical flux from the light source part 30 is radiated within a range from +b to +a (or from −a to −b). Then, the optical scanning element 19a performs outgoing-path scanning of the inspection-use light when the reflection mirror 19b is swung from +a to +b, and performs incoming-path scanning of the inspection-use light when the reflection mirror 19b is swung from +b to +a.

Further, as shown in FIG. 2, the image display device 1 includes a light blocking mask 31a which is arranged outside the effective scanning range of the optical flux and at least around the photo detector 31, and functions as a blocking unit which blocks the optical flux outside the effective scanning range without blocking the optical flux to the photo detector 31. Due to the provision of the light blocking mask 31, there is no possibility that the inspection-use light enters a pupil 24 of a viewer thus preventing the obstruction of an image display by the inspection-use light.

[Generation of Signals by Photo Detector]

Here, the generation of signals by the photo detector 31 is explained in conjunction with FIG. 3A and FIG. 3B.

The photo detector 31 of this embodiment is a photo IC for photo detection, and includes a light receiving portion in the inside of a chip thereof. As shown in FIG. 3A and FIG. 3B, the photo detector 31 includes the light receiving portion, and the light receiving portion includes a first light receiving surface 121 and a second light receiving surface 122 having a rectangular shape respectively. A width of the first light receiving surface 121 is set smaller than a width of the second light receiving surface 122.

When the inspection-use light scanned by the optical scanning element 19a passes the respective light receiving surfaces 121, 122 in the direction toward the second light receiving surface 122 from the first light receiving surface 121 (A direction), the photo detector 31 generates output signals having pulses of a width corresponding to a passing time of the respective light receiving surfaces 121, 122 at a point of time that the inspection-use light passes the respective light receiving surfaces 121, 122. That is, the output signal Ro1 having a pulse is generated when the inspection-use light passes the first light receiving surface 121, and the output signal Ro2 having a pulse is generated when the inspection-use light passes the second light receiving surface 122. FIG. 3A indicates an output waveform of the output signal Ro1 and an output waveform of the output signal Ro2 at the time of scanning the optical flux in the A direction.

A BD signal Rbd is generated in a circuit arranged in the inside of the chip of the photo IC based on the above-mentioned two output signals, that is, the output signal Ro1 and the output signal Ro2. That is, the BD signal Rbd which is a pulse signal having a width corresponding to a time during which the inspection-use light is detected is generated. FIG. 3A is a timing chart showing a waveform of the BD signal Rbd generated at the time of scanning the optical flux in the A direction. As shown in FIG. 3A, the BD signal Rbd has a falling edge between the first light receiving surface 121 and the second light receiving surface 122 (indicated by a broken line).

Further, when the inspection-use light scanned by the optical scanning element 19a passes the respective light receiving surfaces 121, 122 in the direction toward the first light receiving surface 121 from the second light receiving surface 122 (B direction), the photo detector 31 generates two pulse signals having a width corresponding to a passing time of the respective light receiving surfaces 121, 122 at a point of time that the inspection-use light passes the respective light receiving surfaces 121, 122. FIG. 3B indicates an output waveform of the output signal Ro1 generated at a point of time that the inspection-use light passes the first light receiving surface 121, and an output waveform of the output signal Ro2 generated at a point of time that the inspection-use light passes the second light receiving surface 122.

Based on the above-mentioned two output signals consisting of the output signal Ro1 and the output signal Ro2, a BD signal Rbd which is a pulse signal is generated in a circuit arranged in the inside of the chip of the photo IC. As shown in FIG. 3B, the BD signal Rbd which is generated at the time of scanning the optical flux in the B direction also possesses a rising edge which is arranged between the first light receiving surface 121 and the second light receiving surface 122 (indicated by a broken line).

[Radiation Timing of Optical Flux]

In this embodiment, the photo detector 31 is arranged at a position where a portion of the inspection-use light which is scanned in a reciprocating manner by the optical scanning element 19a passes in both the outgoing-path scanning and the incoming-path scanning. However, even when the position of the photo detector 31 is displaced, the staggering of the radiation timing of the optical flux from the light source unit 2 hardly occurs. This staggering control is explained in detail hereinafter in conjunction with FIG. 4 to FIG. 6.

Figure 4:
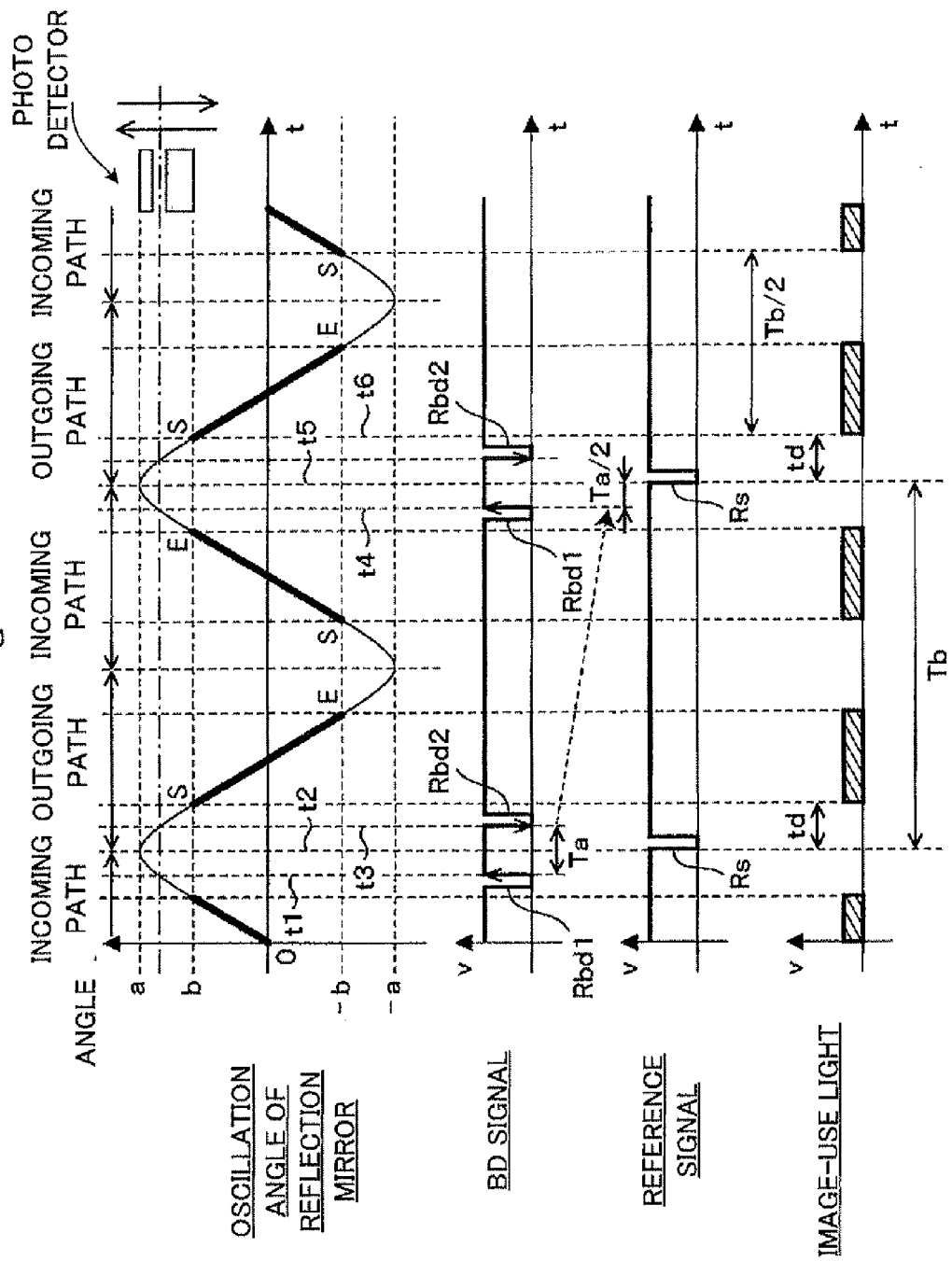
FIG. 4 is a timing chart for explaining the generation of reference signals in the embodiment 1.

Firstly, in conjunction with FIG. 4, the explanation is made with respect to the mechanism that an image is formed by scanning the inspection-use light radiated from the image modulator 201 by the optical scanning elements 19a, 21a based on a reference signal generated by photo detection conducted by the photo detector 31.

FIG. 4 shows an oscillation state of the reflection mirror 19b of the optical scanning element 19a, wherein time t is taken on an axis of abscissas, and an angle of the reflection mirror 19b of the optical scanning element 19a is taken on an axis of ordinates. A trajectory of an angle of the reflection mirror 19b draws, as shown in FIG. 4, a line having predetermined amplitude and a predetermined cycle. As shown in FIG. 4, the optical scanning element 19a scans the inspection-use light when the angle of the reflection mirror 19b falls within a range of +b to +a, and scans the image-use light when the angle of the reflection mirror 19b falls within a range of +b to −b. Here, when the angle of the reflection mirror 19b falls within a range of −a to −b, a state where neither the inspection-use light nor the image-use light is scanned takes place.

FIG. 4 shows a waveform of a BD signal Rbd which is a pulse signal outputted corresponding to a time that the photo detector 31 detects the scanned inspection-use light. Here, as shown in FIG. 2, the photo detector 31 is arranged at a position between the optical scanning element 19a and the relay optical system 20.

The photo detector 31 is arranged such that the inspection-use light scanned by the optical scanning element 19a passes in the direction from the second light receiving surface 122 to the first light receiving surface 121 at a point of time in outgoing-path scanning as shown in FIG. 3A. Further, the photo detector 31 is arranged such that the inspection-use light scanned by the optical scanning element 19a passes in the direction from the first light receiving surface 121 to the second light receiving surface 122 in incoming-path scanning as shown in FIG. 3B. When the inspection-use light passes the detection position of the photo detector 31, the photo detector 31 generates a BD signal Rbd corresponding to a time during which the inspection-use light is detected as shown in FIG. 3A and FIG. 3B.

To be more specific, when the photo detector 31 detects the inspection-use light scanned by the optical scanning element 19a at a point of time in incoming-path scanning (at a point of time t1), as shown in FIG. 4, the photo detector 31 generates a first BD signal Rbd1 having a rising edge at a point of time t1. Next, when the photo detector 31 detects the inspection-use light scanned by the optical scanning element 19a at a point of time in outgoing-path scanning (at a point of time t3), as shown in FIG. 4, the photo detector 31 generates a second BD signal Rbd2 having a falling edge at a point of time t3.

The reference signal generator 200 detects an interval Ta between the first BD signal Rbd1 and the second BD signal Rbd2 which are continuously outputted from the photo detector 31. Further, in the reference signal generator 200, Ta/2 is calculated and, as shown in FIG. 4, at a point of time t5 after a lapse of Ta/2 from a rising edge of the first BD signal Rbd1 outputted next from the photo detector 31 (a point of time t4), a reference signal Rs which becomes radiation timing for radiating an image-use light from the light source unit 2 is generated. Then, based on the reference signal Rs, as shown in FIG. 4, at a point of time t6 after a lapse of td from the point of time t5, an image-use light is radiated from the light source unit 2, and is subject to the outgoing-path scanning by the optical scanning element 19a. Then, after a lapse of time which is ½ of the oscillation cycle Tb of the reflection mirror 19b of the optical scanning element 19a (Tb/2) from the point of time t5, the image-use light is subject to the incoming-path scanning by the optical scanning element 19a. Thereafter, in the same manner as the above-mentioned steps, a reference signal Rs is generated based on the intermediate timing between the rising edge of the first BD signal Rbd1 and the falling edge of the second BD signal Rbd2, the image-use light is radiated from the light source unit 2 based on the reference signal Rs, and the outgoing-path scanning and the incoming-path scanning are continuously performed. Accordingly, one sheet of two-dimensional image is formed and this formed image is observed by a viewer with his naked eyes.

Here, it is necessary to determine whether the BD signal Rbd continuously outputted from the photo detector 31 is the first BD signal Rbd1 or the second BD signal Rbd2. In this embodiment, the intermediate timing between the first BD signal Rbd1 and the second BD signal Rbd2 which is outputted next from the photo detector 31 is used and hence, it is necessary not to use the intermediate timing between the second BD signal Rbd2 and the first BD signal Rbd1 which is outputted next from the photo detector 31.

Accordingly, the reference signal generator 200 determines an interval between the BD signals Rbd (first BD signal Rbd1, second BD signal Rbd2) which are outputted continuously from the photo detector 31. Then, by selecting the first BD signal Rbd1 and the second BD signal Rbd2 having a small interval therebetween out of these BD signals Rbd, the reference signal generator 200 detects the first BD signal Rbd1 at a point of time t1 which is outputted from the photo detector 31 and the second BD signal Rbd2 at a point of time t3 which is outputted next from the photo detector 31. Then, by detecting rising edge timing (point of time t1) of the first BD signal Rbd1 and falling edge timing (point of time t3) of the second BD signal Rbd2, the reference signal generator 200 generates a reference signal Rs based on these timings. Due to such steps, the reference signal generator 200 can generate the reference signal Rs which has a falling edge when an angle of the reflection mirror 19b of the optical scanning element 19a is +a.

If the reference signal Rs is generated using the rising edge timing of the first BD signal Rbd1 and the rising edge timing of the second BD signal Rbd2, at intermediate timing between these rising edge timing, the reference signal Rs having a falling edge at timing which is staggered from timing at which an angle of the reflection mirror 19b of the optical scanning element 19a is +a by ½ of a pulse width of the second BD signal Rbd2 is generated. However, the pulse width of the second BD signal Rbd2 is changed due to a change of the reflection mirror 19b within a swinging angle range (+a to −a) and hence, the intermediate timing does not become fixed timing. Accordingly, a start position of a horizontal line which is scanned in outgoing-path scanning and a finish position of a scanning line scanned in incoming-path scanning are displaced from each other thus bringing about a zigzag state at an edge portion of a screen. Accordingly, an image largely deteriorates.

On the other hand, according to this embodiment, the rising edge timing of the first BD signal Rbd1 and the falling edge timing of the second BD signal Rbd2 are detected, and the intermediate timing between these timings is used and hence, the intermediate timing becomes fixed timing. Accordingly, it is possible to prevent the occurrence of displacement between the start position of the horizontal line scanned in the outgoing-path scanning and the finish position of the horizontal line scanned in the incoming-path scanning thus suppressing the deterioration of an image.

As shown in FIG. 4, the start position S of outgoing-path scanning is an angular position of the reflection mirror 19b of the optical scanning element 19a at radiation start timing of an image-use light from the light source unit 2, and the finish position E of outgoing-path scanning is the angular position of the reflection mirror 19b of the optical scanning element 19a at radiation finish timing of the image-use light from the light source unit 2. Accordingly, by starting the radiation of an optical flux from the fixed start position S with respect to all horizontal lines, an image of good quality is formed. In this embodiment, radiation timing of the image-use light from the light source unit 2 is decided based on the reference signal Rs having the falling edge when the angle of the reflection mirror 19b of the optical scanning element 19a is +a and hence, it is possible to set the start position S and the finish position E to fixed positions.

As a result, even when the positional accuracy of the photo detector 31 is not sufficient, the staggering of radiation timing of the optical flux from the light source unit 2 hardly occurs. Accordingly, the displacement of the scanning position of the optical flux can be suppressed thus preventing drawbacks such as the displacement in a display of an image by optical scanning.

Further, even when amplitude of an optical flux scanned by the optical scanning element 19a differs, this difference merely brings about the difference between timing of the rising edge of the first BD signal Rbd1 which the photo detector 31 generates and timing of the falling edge of the second BD signal Rbd2 which the photo detector 31 generates, and the intermediate timing between these timings is fixed. Accordingly, it is possible to set radiation timing of the optical flux from the light source unit 2 to a fixed value.

[Constitution of Reference Signal Generator]

Here, the reference signal generator 200 is explained in conjunction with FIG. 5. FIG. 5 is a block diagram showing the reference signal generator 200 and parts around the reference signal generator 200 according to an embodiment 1 of the present invention.

Firstly, BD signals Rbd (first BD signal Rbd1 and second BD signal Rbd2) which are pulse signals continuously outputted from the photo detector 31 are sequentially inputted into the reference signal generator 200. Next, in a sampling unit 101, the BD signals Rbd are sampled at a predetermined clock (for example, a master clock of an image display device). After sampling is finished, a result of the sampling is outputted to a timing measuring unit 102.

Next, in the timing measuring unit 102, based on the sampling result of the BD signals Rbd by the sampling unit 101, detection timing of the BD signals Rbd continuously outputted from the photo detector 31 is measured by counting the detection timing by a counter at a predetermined clock. A result of the measurement is outputted to a time comparator 103.

Next, in the time comparator 103, based on the detection timing of the BD signals Rbd outputted from the timing measuring unit 102, an interval between every two BD signals Rbd1, Rbd2 continuously outputted from the photo detector 31 is continuously detected, two BD signals Rbd1, Rbd2 having the small interval therebetween are selected, and the interval between rising edge timing of the first BD signal Rbd1 and falling edge timing of the second BD signal Rbd2 selected in this manner is detected as an interval Ta.

Thereafter, ½ of the interval Ta is calculated by a divider 104. Then, the interval Ta/2 is stored in a memory 105.

In a timing selection unit 106, based on the interval of BD signals Rbd detected by the time comparator 103, out of the BD signals outputted from the photo detector 31, the first BD signal Rbd1 outputted from the photo detector 31 next to the BD signals Rbd1, Rbd2 which is used for the detection of the interval Ta is selected, and the selected first BD signal Rbd1 is outputted to a delay circuit 107 described later. For example, when the BD signals which is used for the detection of the interval Ta are the first BD signal Rbd1 at a point of time t1 and the second BD signal Rbd2 at a point of time t3, the first BD signal Rbd1 at a point of time t4 outputted from the photo detector 31 next is selected, and the selected first BD signal Rbd1 is outputted to the delay circuit 107.

Then, in the delay circuit 107, the first BD signal Rbd1 outputted from the timing selection unit 106 is further delayed from the rising edge by Ta/2 in addition to the delay of a time having a pulse width of the first BD signal Rbd1, and the delayed first BD signal Rbd1 is outputted to the video signal supply circuit 3. For example, when the first BD signal Rbd1 at a point of time t4 is outputted from the timing selection unit 106, as shown in FIG. 4, the reference signal Rs is outputted after a lapse of Ta/2 from the rising edge of the first BD signal Rbd1 at a point of time t4.

The generated reference signal Rs is inputted to the video signal supply circuit 3. In the video signal supply circuit 3, a reading part 112 reads an image signal S from a RAM 114 which stores an image signal S inputted from the outside using the reference signal Rs as the reference, and the image signal is outputted to the light source part 30. Here, in synchronism with a master clock, data for every pixel is read from the RAM 114. In the light source part 30, an image-use light for outgoing-path scanning is radiated after a lapse of td of the reference signal Rs based on data read for every pixel, and an image-use light for incoming-path scanning is radiated after a lapse of (td+Ta/2) of the reference signal Rs.

In the explanation made above, the reference signal generator 200 determines the interval between the BD signals Rbd continuously outputted from the photo detector 31, and generates the reference signal Rs based on the intermediate timing between two BD signals Rbd having the small interval therebetween. However, the reference signal generator 200 may generate the reference signal Rs such that two BD signals Rbd which are continuously outputted from the photo detector 31 and have the interval therebetween smaller than ½ of a cycle Tb of resonance oscillation of the reflection mirror 19b are detected, and the reference signal Rs is generated based on intermediate timing between the BD signals Rbd detected in this manner. In this case, in the time comparator 103, the interval between two BD signals Rbd1, Rbd2 which are continuously outputted from the photo detector 31 is continuously detected, two BD signals Rbd1, Rbd2 having an interval which is smaller than ½ of the cycle Tb of resonance oscillations of the reflection mirror 19b are selected, an interval between rising edge timing of the first BD signal Rbd1 and falling edge timing of the second BD signal Rbd2 selected in this manner is detected, and the detected interval is set as the interval Ta. By generating the reference signal Rs in this manner, it is unnecessary for the reference signal generator 200 to perform processing for comparing intervals each made between every two BD signals Rbd and hence, the detection of two BD signals Rbd having a small interval therebetween is facilitated.

Further, in the explanation made above, the reference signal generator 200 determines the interval between the BD signals Rbd continuously outputted from the photo detector 31, and generates the reference signal Rs based on the intermediate timing between two BD signals Rbd having a small interval therebetween. However, the reference signal Rs may be generated such that an interval between BD signals Rbd which are continuously outputted from the photo detector 31 is determined, and the reference signal Rs is generated based on intermediate timing between two BD signals Rbd whose interval is large. In the same manner, the reference signal Rs may be generated such that two BD signals Rbd whose interval is larger than ½ of a cycle Tb of resonance oscillations of the reflection mirror 19b are detected, and the reference signal Rs is generated based on intermediate timing between the BD signals Rbd detected in this manner.

Next, FIG. 6 shows a timing chart when the relationship between the first light receiving surface 121 and the second light receiving surface 122 of the photo detector 31 is reversed with respect to the corresponding relationship shown in FIG. 4. That is, FIG. 6 shows the timing chart for explaining the generation of the first BD signal Rbd1 which is a pulse signal when the inspection-use light scanned by the optical scanning element 19a in outgoing-path scanning passes from the first light receiving surface 121 to the second light receiving surface 122, and the generation of the second BD signal Rbd2 which is a pulse signal when the inspection-use light scanned by the optical scanning element 19a in incoming-path scanning passes from the second light receiving surface 122 to the first light receiving surface 121.

When the relationship between the first light receiving surface 121 and the second light receiving surface 122 of the photo detector 31 is reversed, as shown in FIG. 6, the first BD signal Rbd1 becomes a pulse signal having a falling edge at a point of time t1, and the second BD signal Rbd2 becomes a pulse signal having a rising edge at a point of time t3.

Then, the reference signal generator 200 detects Ta based on the falling edge timing (a point of time t1) of the first BD signal and the rising edge timing (a point of time t3) of the second BD signal. The reference signal generator 200 also decides Ta/2 and, as shown in FIG. 6, generates the reference signal Rs which becomes the reference of radiation timing of an image-use light from the light source unit 2.

Further, as shown in FIG. 6, at a point of time t6 after a lapse of td from the above-mentioned point of time t5, the radiation of the image-use light from the light source unit 2 is started so that outgoing-path scanning is performed by the optical scanning element 19a. Then, after a time (Tb/2) which is ½ of an oscillation cycle Tb of the reflection mirror 19b of the optical scanning element 19a elapses, the radiation of the image-use light from the light source unit 2 is started so that incoming-path scanning is performed by the optical scanning element 19a. Thereafter, the outgoing-path scanning and the incoming-path scanning are continuously performed in a repeated manner.

In this manner, even when the relationship between the first light receiving surface 121 and the second light receiving surface 122 of the photo detector 31 is reversed, the reference signal generator 200 can generate the reference signal Rs having the falling edge when the angle of the reflection mirror 19b of the photo scanning element 19a assumes +a.

As a result, even when the sufficient positional accuracy of the photo detector 31 cannot be ensured, the staggering of radiation timing of the optical flux from the light source unit 2 hardly occurs. Accordingly, the displacement of the scanning position of the image-use light can be suppressed thus preventing the occurrence of drawbacks such as the displacement in a display of an image by optical scanning.

(Embodiment 2)

Figure 8A:
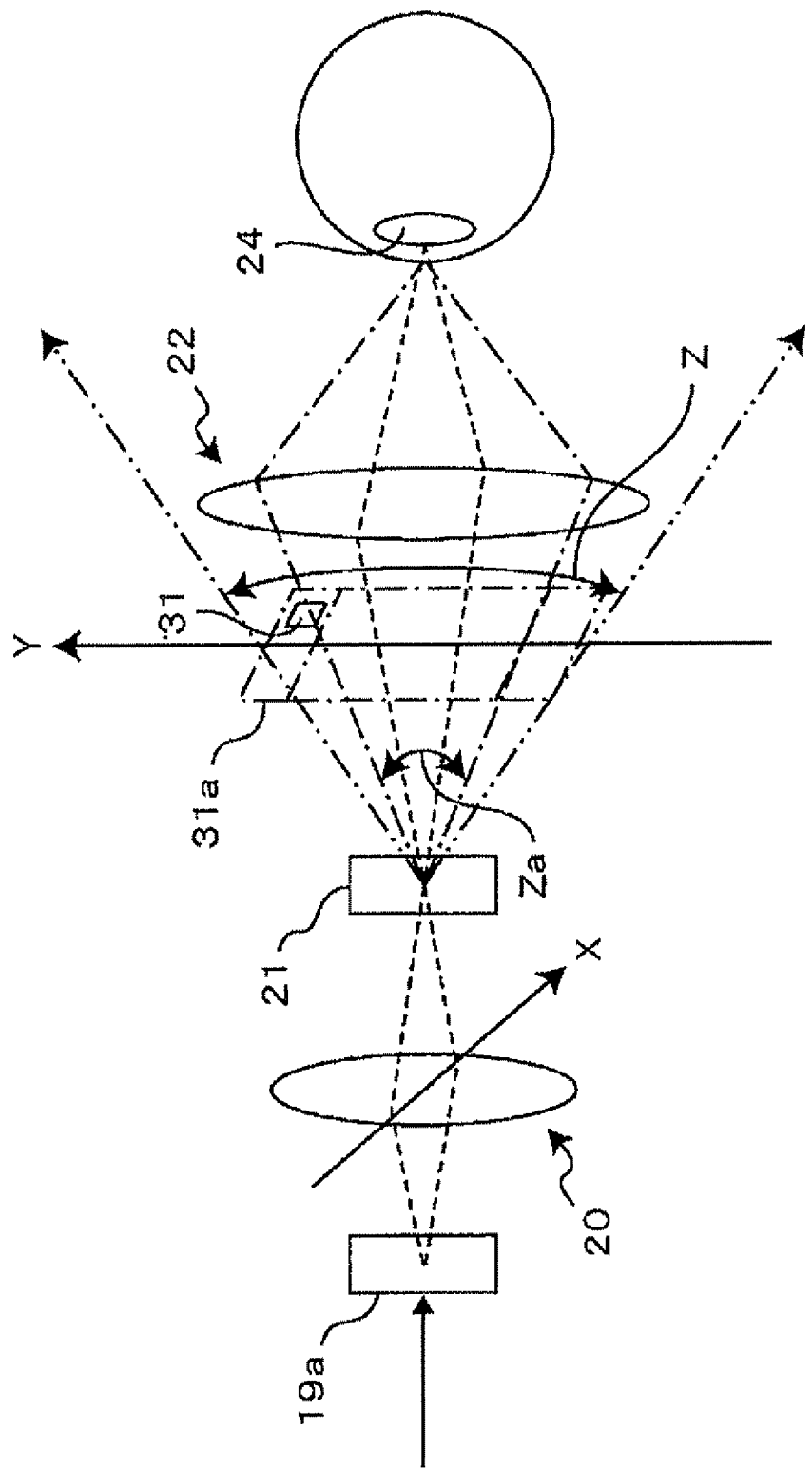
FIG. 8A is an image view showing optical scanning performed in the embodiment 2.

In the embodiment 1, the photo detector 31 is arranged at the position between the optical scanning element 19a and the vertical scanning part 21. However, the photo detector 31 may be arranged at a position between the vertical scanning part 21 and the relay optical system 22. Hereinafter, the explanation is made with respect to a case where the photo detector 31 is arranged at the position between the vertical scanning part 21 and the relay optical system 22 in conjunction with FIG. 7 to FIG. 9. Symbols used in FIG. 7 to FIG. 9 are equal to the symbols used in FIG. 1 to FIG. 6 with respect to constitutional elements identical with the constitutional elements shown in FIG. 1 to FIG. 6.

In the embodiment 2, as shown in FIG. 7, the photo detector 31 is arranged at the position between the vertical scanning part 21 and the relay optical system 22. That is, as shown in FIG. 8A, the photo detector 31 is arranged at a position where an inspection light can be detected, wherein the inspection light is scanned at a scanning position which falls within a predetermined angle in the + direction from a center position (0) of an oscillation angle of the reflection mirror 21b of the optical scanning element 21a.

Figure 8B:
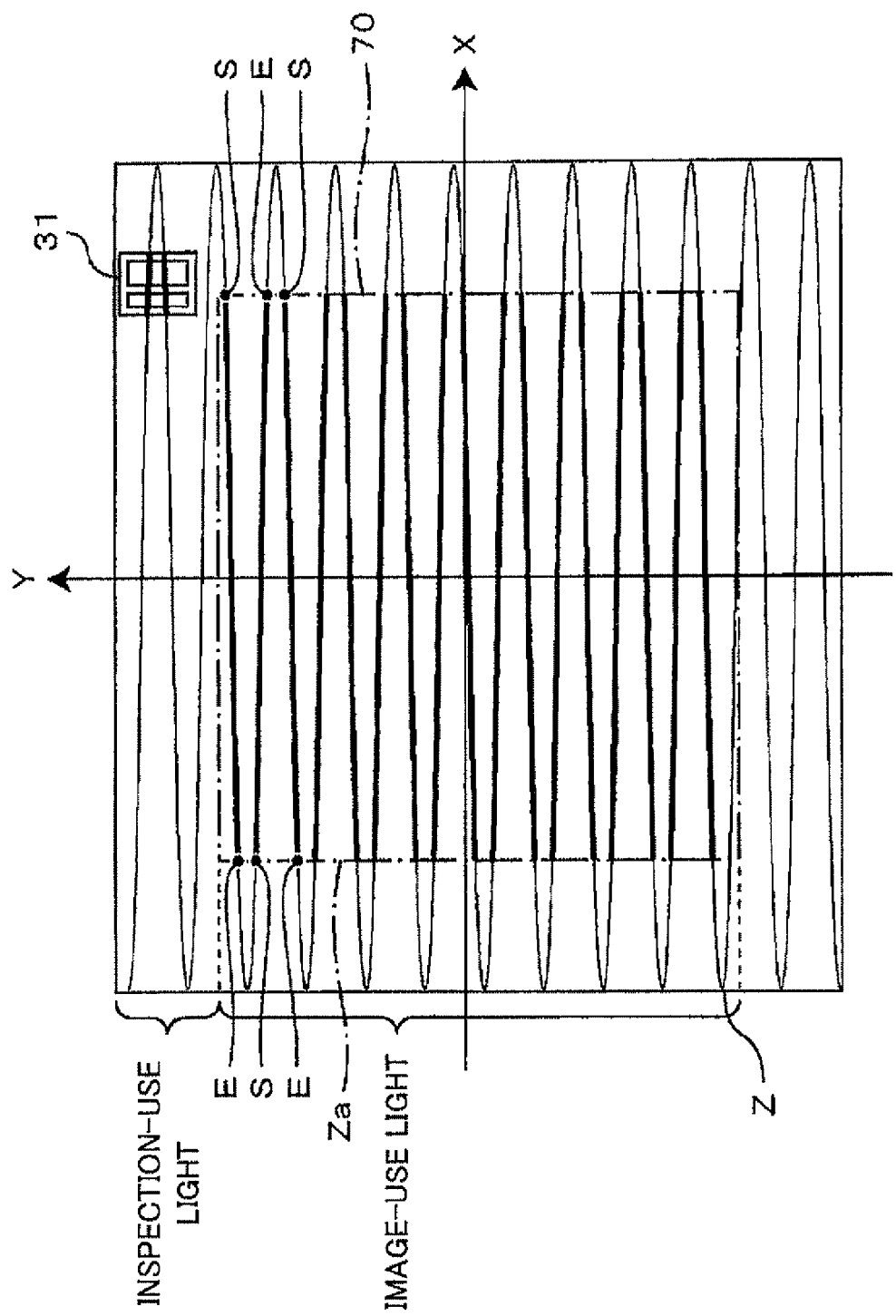
FIG. 8B is an image view showing optical scanning performed in the embodiment 2.
Figure 9:
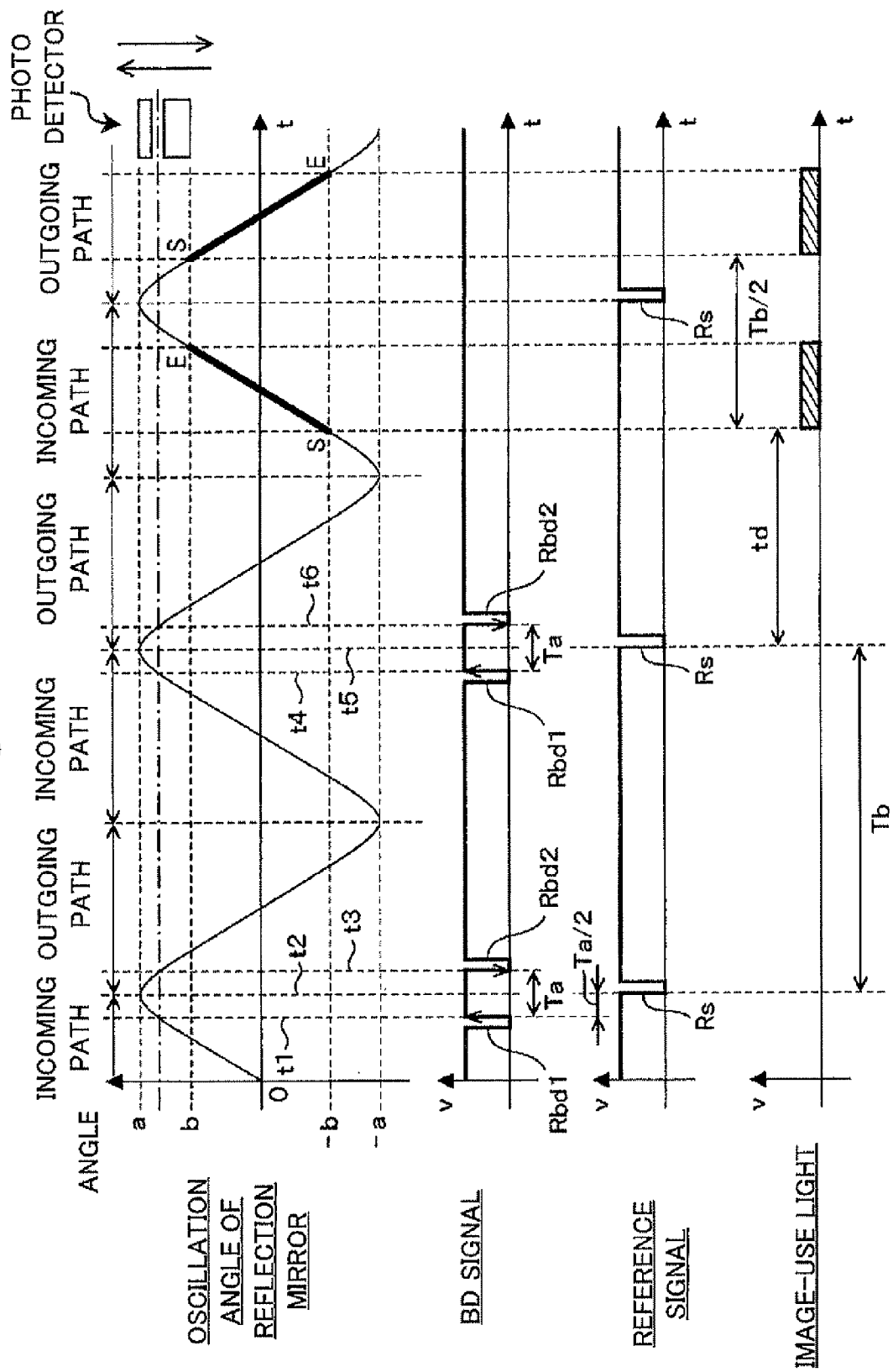
FIG. 9 is a timing chart for explaining the generation of reference signals in the embodiment 2.

Further, as shown in FIG. 8B, the photo detector 31 is arranged so as to detect an inspection-use light outside a range of the image-use light. In FIG. 8B, the photo detector 31 is configured to be arranged outside the range of the image-use light and above the range when the drawing is viewed from a viewer's side. However, the arrangement or the position of the photo detector 31 is not limited to the above, and the photo detector 31 may be configured to be arranged outside the range of the image-use light and below the range when the drawing is viewed from a viewer's side.

Also by arranging the photo detector 31 between the vertical scanning part 21 and the relay optical system 22 as in the case of this embodiment 2, in the same manner as the above-mentioned embodiment 1, it is possible to generate the reference signal Rs which becomes radiation timing of the optical flux from the light source unit 2 at fixed timing.

Here, in the above-mentioned embodiment 1, the reference signal Rs is generated and outputted by detecting the BD signal Rbd for every scanning (for every reciprocating scanning of the optical flux) by the optical scanning element 19a. However, in this embodiment 2, the inspection-use light is not radiated during a period corresponding to an effective scanning range and hence, there exists a period in which the BD signal Rbd cannot be detected before 1 scanning by the optical scanning element 21a in the vertical direction is finished.

Accordingly, the reference signal generator 200 of the image display device 1 according to the embodiment 2 includes, in place of the delay circuit 107, a reference signal outputting part which outputs the reference signal Rs for every cycle Tb of 1 scanning by the optical scanning element 19a based on the first BD signal Rbd1 outputted from the timing selection unit 106. That is, as shown in FIG. 9, during a period in which the first BD signal Rbd1 is outputted from the timing selection unit 106, in the same manner as the embodiment 1, the reference signal Rs which is obtained by delaying the first BD signal Rbd1 using Ta/2 stored in the memory 105 is outputted, while during a period in which the first BD signal Rbd1 is not outputted from the timing selection unit 106, the reference signal Rs is outputted for every cycle Tb.

As described above, even by arranging the photo detector 31 between the vertical scanning part 21 and the relay optical system 22, it is possible to generate the reference signal Rs which becomes the radiation timing of the optical flux from the light source unit 2.

Although several embodiments of the present invention have been explained in detail in conjunction with the drawings heretofore, these embodiments merely constitute examples, and the present invention can be carried out in other modes to which various modifications and improvement are applied based on knowledge of those who are skilled in the art.

As described above, even when the sufficient positional accuracy of the photo detector 31 cannot be ensured, the staggering of radiation timing of the optical flux from the light source part 2 hardly occurs. Accordingly, the displacement of the scanning position of the optical flux can be suppressed thus preventing the occurrence of drawbacks such as the displacement in a display of an image by optical scanning.

What is claimed is:

1. An optical scanning device comprising:
   an optical scanning element which has a reflection mirror and is configured to perform reciprocating scanning of an optical flux radiated from a light source by resonance oscillations of the reflection mirror;
   a photo detector which is arranged at a position which a portion of the optical flux scanned by the optical scanning element in a reciprocating manner passes in both outgoing-path scanning as well as in incoming-path scanning, and is configured to output a pulse signal having a predetermined width at a point of time that the scanned optical flux is detected; and a reference signal generator which is configured to generate a reference signal which becomes the reference for radiation timing of the optical flux from the light source corresponding to a detection result of the optical flux by the photo detector, wherein the reference signal generator is configured either (1) to detect a timing interval between rising edge timing of a first pulse signal out of two pulse signals continuously outputted from the photo detector and falling edge timing of a second pulse signal out of the two pulse signals continuously outputted from the photo detector, and to generate the reference signal at a point in time after lapse of half the timing interval from the rising edge timing of the pulse signal outputted next from the photo detector, or (2) to detect a timing interval between falling edge timing of a first pulse signal out of the two pulse signals continuously outputted from the photo detector and rising edge timing of a second pulse signal out of the two pulse signals continuously outputted next from the photo detector, and to generate the reference signal at a point in time after lapse of half the timing interval from the falling edge timing of the pulse signal outputted next from the photo detector.

2. The optical scanning device according to claim 1, wherein the reference signal generator is configured to determine an interval between every two pulse signals out of the pulse signals which are continuously outputted from the photo detector, and the reference signal is generated based on the timing interval between two pulse signals having the small interval therebetween.

3. The optical scanning device according to claim 1, wherein the reference signal generator is configured to generate the reference signal based on the timing interval between said two pulse signals having the interval therebetween which is smaller than ½ of a cycle of resonance oscillations of the reflection mirror out of the pulse.

4. An image display device which includes the optical scanning device according to claim 1, and is configured to display an image by scanning an optical flux modulated in response to an image signal by the optical scanning element.

5. A retinal scanning display which includes the optical scanning device according to claim 1, and is configured to project and display an image on a retina of an eye by scanning an optical flux modulated in response to an image signal by the optical scanning element.

* * * * *